(12) United States Patent
Taherzadeh Boroujeni et al.

(10) Patent No.: US 11,882,577 B2
(45) Date of Patent: Jan. 23, 2024

(54) PHYSICAL DOWNLINK CONTROL CHANNEL CANDIDATES AGGREGATED OVER DIFFERENT NUMBERS OF MONITORING OCCASIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 17/304,090

(22) Filed: Jun. 14, 2021

(65) Prior Publication Data
US 2022/0015104 A1    Jan. 13, 2022

Related U.S. Application Data

(60) Provisional application No. 62/705,681, filed on Jul. 10, 2020.

(51) Int. Cl.
*H04W 72/53* (2023.01)
*H04L 27/26* (2006.01)
(Continued)

(52) U.S. Cl.
CPC ....... *H04W 72/53* (2023.01); *H04L 27/26025* (2021.01); *H04W 24/08* (2013.01);
(Continued)

(58) Field of Classification Search
CPC . H04W 72/53; H04W 72/23; H04W 72/0446; H04W 72/0453; H04L 27/26025
See application file for complete search history.

(56) References Cited

U.S. PATENT DOCUMENTS

| 2019/0182807 A1 | 6/2019 | Panteleev et al. |
| 2020/0022144 A1* | 1/2020 | Papasakellariou .... H04W 72/23 |
| 2020/0052857 A1 | 2/2020 | Xu et al. |

FOREIGN PATENT DOCUMENTS

| WO | WO-2019143164 A1 | 7/2019 |
| WO | WO-2020029172 A1 * | 2/2020 .......... H04L 5/0053 |

OTHER PUBLICATIONS

Huawei, et al., "L1 Enhancements for URLLC", 3GPP Draft, R1-1810157, 3GPP TSG RAN WG1 Meeting #94bis, 3rd Generation Partnership Project (3GPP), Mobile Competence Centre, 650, Route Des Lucioles, F-06921 Sophia-Antipolis Cedex, France, vol. RAN WG1. No. Chengdu. China, Oct. 8, 2018-Oct. 12, 2018, Sep. 29, 2018 (Sep. 29, 2018), XP051517572, 16 Pages, Retrieved from the Internet: URL:http://www.3gpp.org/ftp/tsg%5Fran/WG1%5FRL1/TSGR1%5F94b/Docs/R1%2D1810157%2Ezip [retrieved on Sep. 29, 2018] Sect. 2.3.

(Continued)

*Primary Examiner* — Samina F Choudhry
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a set of aggregation levels for a set of physical downlink control channel (PDCCH) candidates within a search space. The UE may decode a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions. Numerous other aspects are described.

30 Claims, 7 Drawing Sheets

(51) Int. Cl.
H04W 72/0446 (2023.01)
H04W 72/0453 (2023.01)
H04W 24/08 (2009.01)
H04W 72/23 (2023.01)

(52) U.S. Cl.
CPC ... *H04W 72/0446* (2013.01); *H04W 72/0453* (2013.01); *H04W 72/23* (2023.01)

(56) References Cited

OTHER PUBLICATIONS

International Search Report and Written Opinion—PCT/US2021/070713—ISA/EPO—dated Sep. 30, 2021.

* cited by examiner

PHYSICAL DOWNLINK CONTROL CHANNEL CANDIDATES AGGREGATED OVER DIFFERENT NUMBERS OF MONITORING OCCASIONS

CROSS-REFERENCE TO RELATED APPLICATION

This Patent Application claims priority to Provisional Patent Application No. 62/705,681, filed on Jul. 10, 2020, entitled "PHYSICAL DOWNLINK CONTROL CHANNEL CANDIDATES AGGREGATED OVER DIFFERENT NUMBERS OF MONITORING OCCASIONS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for determining physical downlink control channel candidates aggregated over different numbers of monitoring occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an indication of a set of aggregation levels for a set of physical downlink control channel (PDCCH) candidates within a search space; and decoding a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions.

In some aspects, a method of wireless communication performed by a base station includes transmitting an indication of a configuration of a search space having a first subset of PDCCH candidates, that are each aggregated within a single PDCCH monitoring occasion and a second subset of PDCCH candidates, that are each aggregated across multiple PDCCH monitoring occasions; and transmitting a PDCCH communication using a PDCCH candidate of the first subset of PDCCH candidates or the second subset of PDCCH candidates.

In some aspects, a UE for wireless communication includes a memory; and one or more processors, coupled to the memory, configured to: receive an indication of a set of aggregation levels for a set of PDCCH candidates within a search space; and decode a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions.

In some aspects, a base station for wireless communication includes a memory; and one or more processors, coupled to the memory, configured to: transmit an indication of a configuration of a search space having a first subset of PDCCH candidates, that are each aggregated within a single PDCCH monitoring occasion and a second subset of PDCCH candidates, that are each aggregated across multiple PDCCH monitoring occasions; and transmit a PDCCH communication using a PDCCH candidate of the first subset of PDCCH candidates or the second subset of PDCCH candidates.

In some aspects, a non-transitory computer-readable medium storing a set of instructions for wireless communication includes one or more instructions that, when executed by one or more processors of a user equipment UE, cause the UE to: receive an indication of a set of aggregation levels for a set of PDCCH candidates within a search space; and decode a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions.

In some aspects, a non-transitory computer-readable medium storing a set of instructions for wireless communication includes one or more instructions that, when executed by one or more processors of a base station, cause the base station to: transmit an indication of a configuration of a search space having a first subset of PDCCH candidates, that are each aggregated within a single PDCCH monitoring occasion and a second subset of PDCCH candidates, that are each aggregated across multiple PDCCH monitoring occasions; and transmit a PDCCH communication using a PDCCH candidate of the first subset of PDCCH candidates or the second subset of PDCCH candidates.

In some aspects, an apparatus for wireless communication includes means for receiving an indication of a set of aggregation levels for a set of PDCCH candidates within a search space; and means for decoding a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions.

In some aspects, an apparatus for wireless communication includes means for transmitting an indication of a configuration of a search space having a first subset of PDCCH candidates, that are each aggregated within a single PDCCH monitoring occasion and a second subset of PDCCH candidates, that are each aggregated across multiple PDCCH monitoring occasions; and means for transmitting a PDCCH communication using a PDCCH candidate of the first subset of PDCCH candidates or the second subset of PDCCH candidates.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
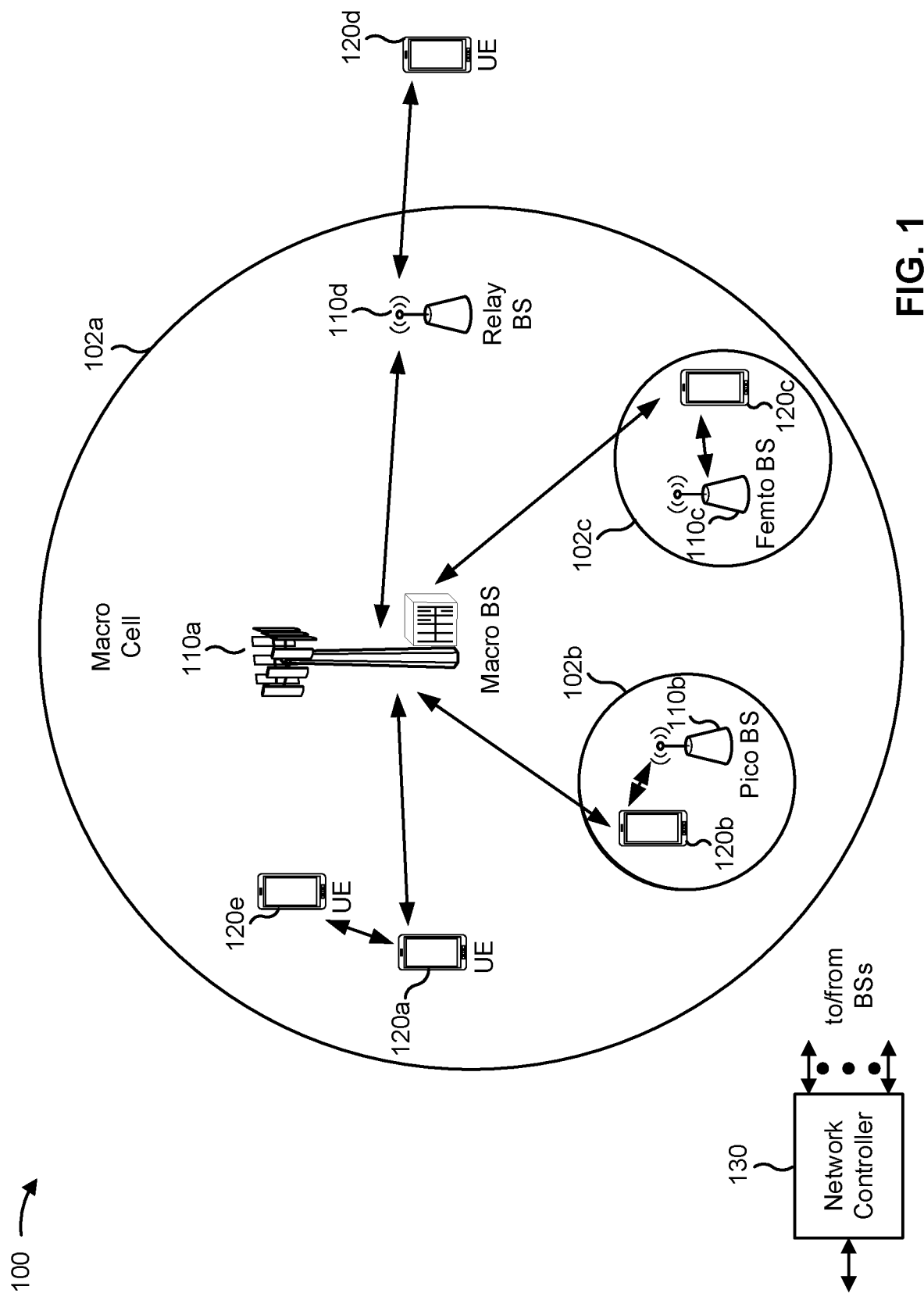
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
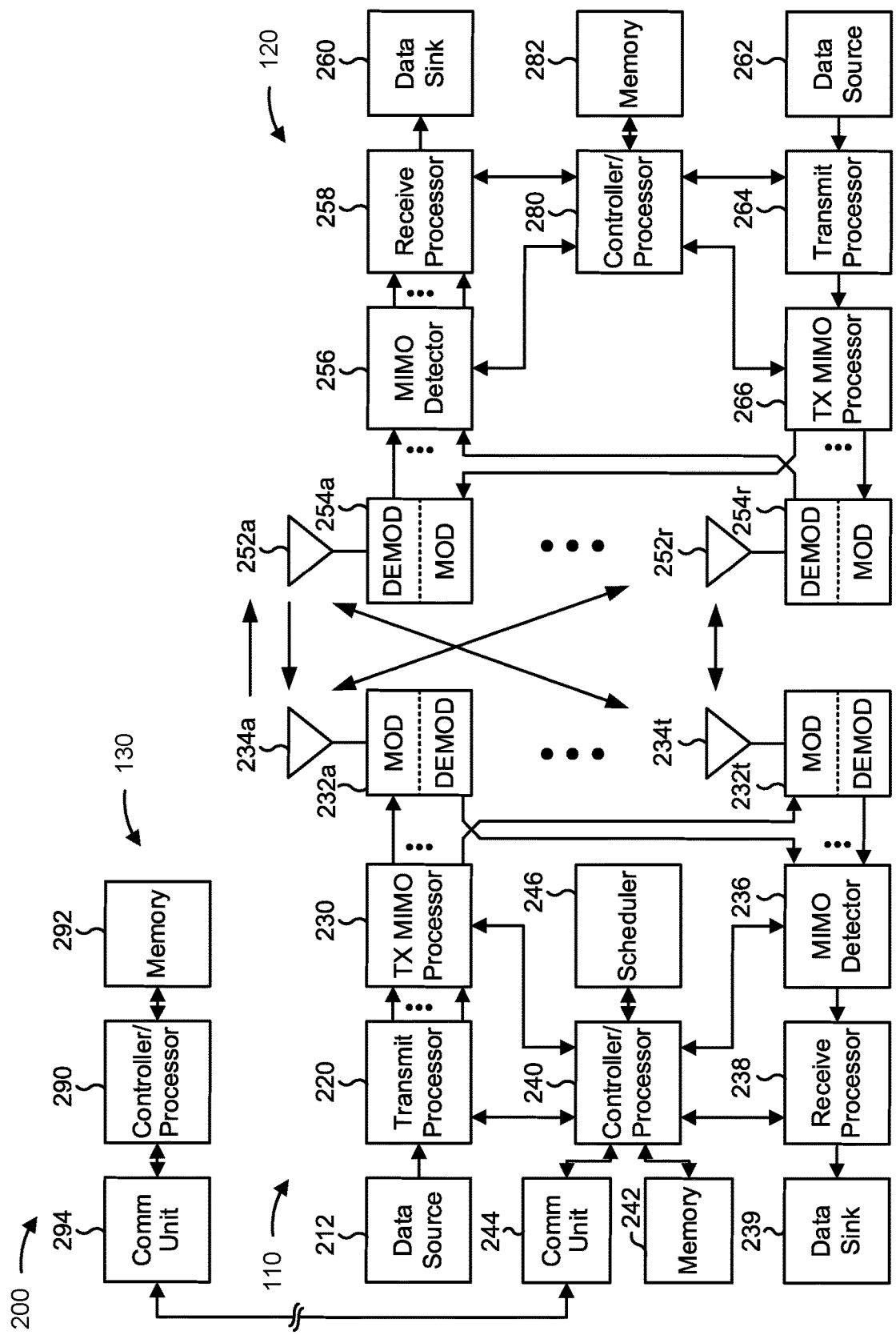
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-7).

Controller/processor 240 of base station 110, controller/processor 280 of UE 120, and/or any other component(s) of FIG. 2 may perform one or more techniques associated with determining PDCCH candidates aggregated over different numbers of monitoring occasions, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving an indication of a set of aggregation levels for a set of PDCCH candidates within a search space; means for determining a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, the user equipment (UE) includes means for receiving an indication of a set of aggregation levels for a set of physical downlink control channel (PDCCH) candidates within a search space; and/or means for decoding a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions. The means for the user equipment (UE) to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting an indication of a configuration of a search space having a first subset of physical downlink control channel (PDCCH) candidates, that are each aggregated within a single PDCCH monitoring occasion and a second subset of PDCCH candidates, that are each aggregated across multiple PDCCH monitoring occasions; and/or means for transmitting a PDCCH communication using a PDCCH candidate of the first subset of PDCCH candidates or the second subset of PDCCH candidates. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
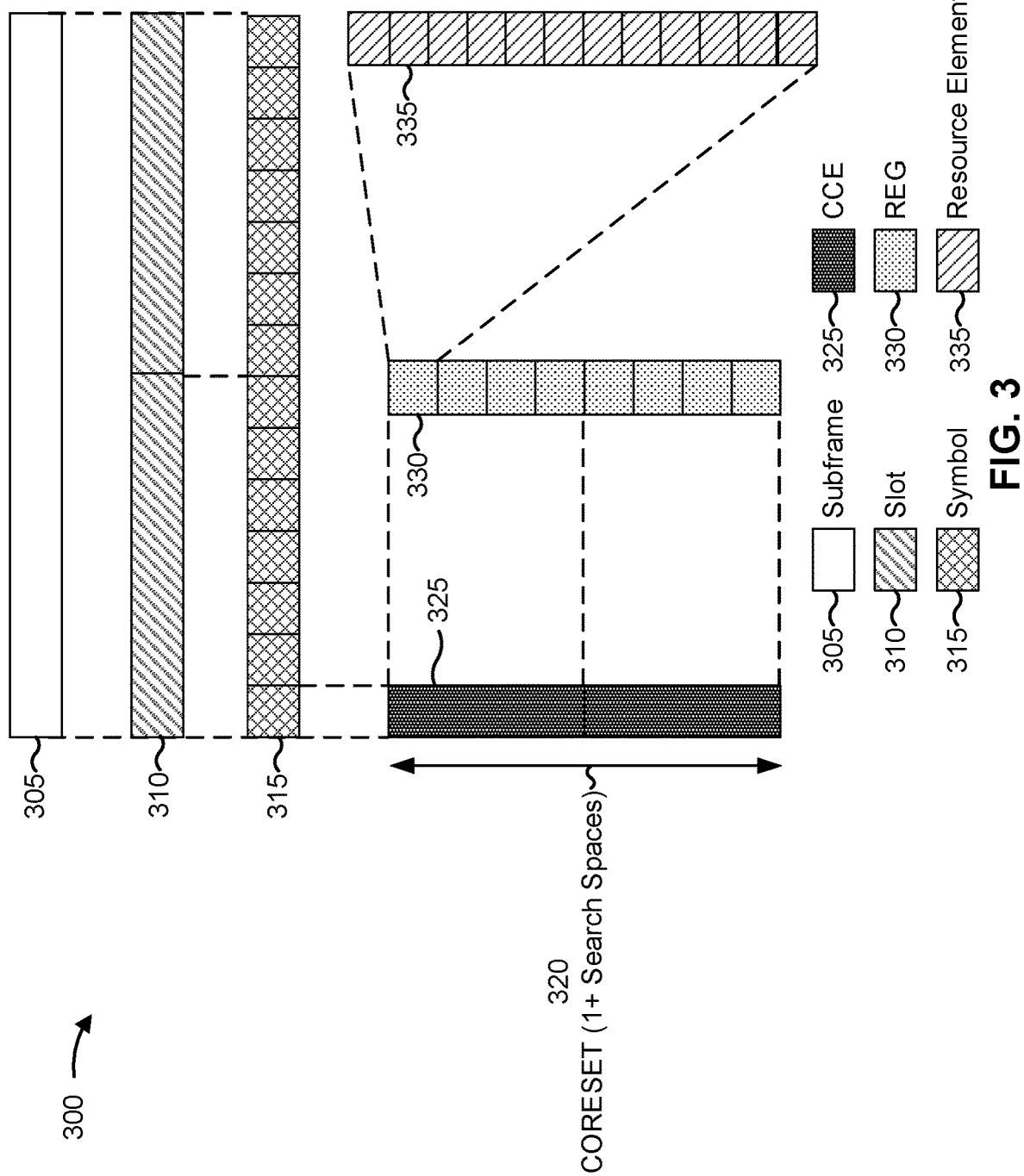
FIG. 3 is a diagram illustrating an example resource structure for wireless communication, in accordance with the present disclosure, in accordance with various aspects of the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 7 symbols per slot, 14 symbols per slot, and/or the like.

The potential control region of a slot 310 may be referred to as a CORESET 320 and may be structured to support an efficient use of resources, such as by flexible configuration or reconfiguration of resources of the CORESET 320 for one or more PDCCHs, one or more physical downlink shared channels (PDSCHs), and/or the like. In some aspects, the CORESET 320 may occupy the first symbol 315 of a slot 310, the first two symbols 315 of a slot 310, the first three symbols 315 of a slot 310, and/or the like. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown in FIG. 3 as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 4, 8, 16, and/or the like.

Each CCE 325 may include a fixed quantity of resource element groups (REGs) 330, shown as four REGs 330 in the example of FIG. 3, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for the PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for the PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

A base station may configure a set of PDCCH candidates within a single PDCCH monitoring occasion or for multiple monitoring occasions. In other words, the set of PDCCH candidates may include CCEs located within only a signal PDCCH monitoring occasion or may include CCEs located within a first PDCCH monitoring occasion and CCEs located within a second PDCCH monitoring occasion. In some examples, a base station may transmit a group-common DCI that activates a preconfigured monitoring aggregation level (e.g., a grouping of PDCCH monitoring occasions for repetition of a same PDCCH). However, a group-common DCI that activates a preconfigured PDCCH monitoring aggregation level may indicate that all UEs that receive the group-common DCI are to search for all PDCCH candidates aggregated over the same number of PDCCH monitoring occasions. For UEs with good reception conditions, using aggregated PDCCH monitoring occasions for all PDCCH candidates may unnecessarily consume communication resources.

In some aspects described herein, a network (e.g., via a base station) may define a first subset of PDCCH candidates and a second subset of PDCCH candidates. The first subset of PDCCH candidates may include PDCCH candidates that are each aggregated (e.g., having multiple CCEs) within a single PDCCH monitoring occasion. The second subset of PDCCH candidates may include PDCCH candidates that are each aggregated across multiple PDCCH monitoring occasions.

In some aspects, a UE may determine whether a PDCCH candidate is assigned to the first subset of PDCCH candidates aggregated over a single PDCCH monitoring occasion or is assigned to the second subset of PDCCH candidates aggregated over multiple PDCCH monitoring occasions based at least in part on an aggregation level of the PDCCH candidate. In some aspects, the UE may determine an aggregation level threshold (e.g., via signaling from the base station, a communication standard, and/or the like) to use for determining whether the PDCCH candidate is assigned to the first subset of PDCCH candidates or the second subset of PDCCH candidates. For example, the PDCCH candidate may be assigned to the second subset of PDCCH candidates, with aggregation over multiple PDCCH monitoring occasions, based at least in part on the PDCCH candidate having an aggregation level that satisfies the aggregation level threshold.

Based at least in part on the UE monitoring for some PDCCH candidates within a single PDCCH monitoring occasion and for other PDCCH candidates within multiple PDCCH monitoring occasions, the UE may conserve computing, communication, network, and power resources by receiving a PDCCH message using a single PDCCH monitoring occasion when appropriate (e.g., based at least in part on channel conditions) and receiving a PDCCH message using multiple PDCCH monitoring occasions when appropriate. For example, a UE with a signal to interference plus noise ratio (SINR) that satisfies a threshold may be capable of receiving a PDCCH message within a single PDCCH monitoring occasion and without coverage benefits of receiving the PDCCH message within multiple PDCCH monitoring occasions (e.g., repetition, time diversity, and/or the like). Based at least in part on receiving the PDCCH message within the single PDCCH monitoring occasion, the UE may ignore other PDCCH monitoring occasions.

Figure 4:
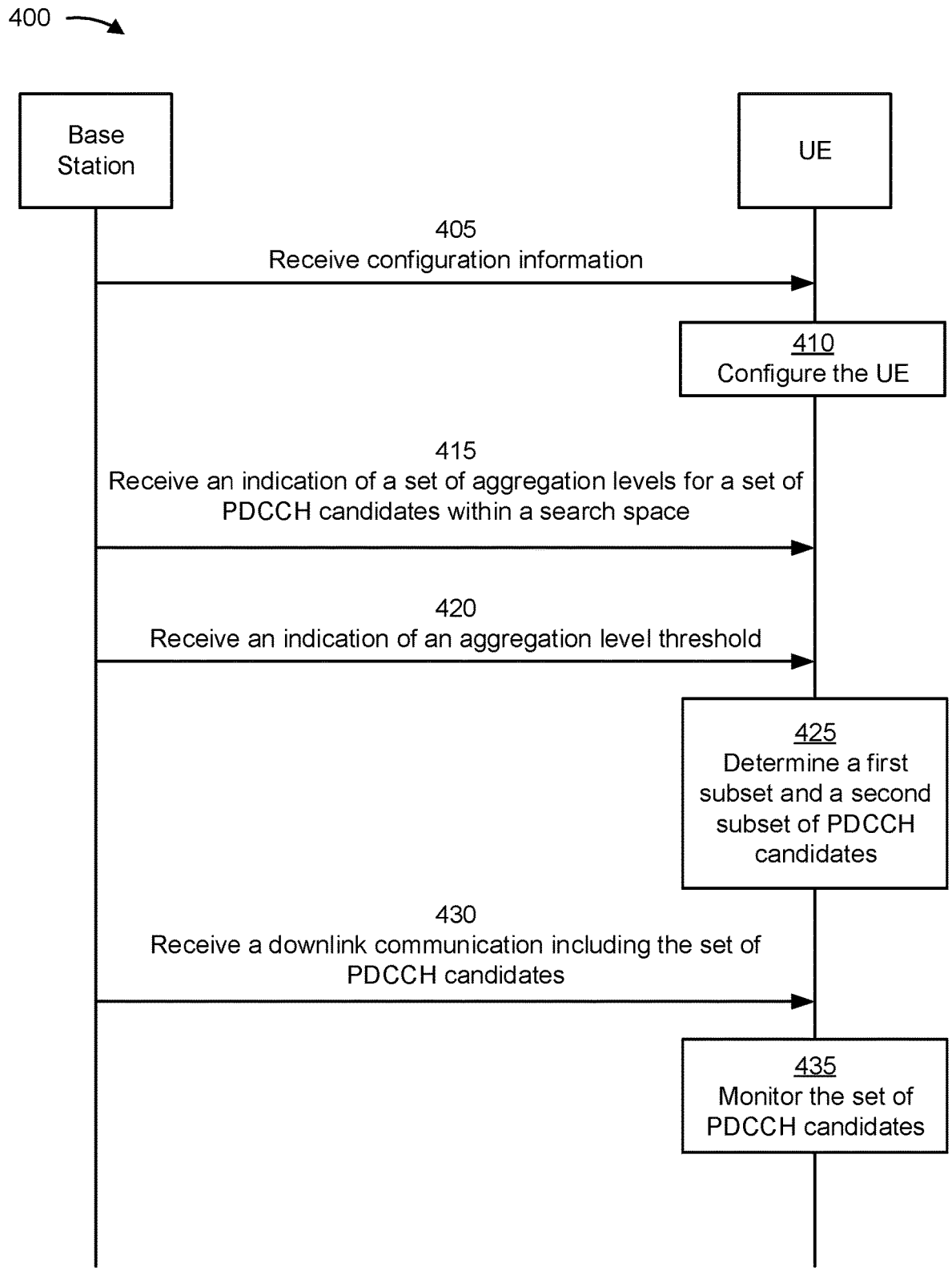
FIGS. 4 and 5 are diagrams illustrating examples associated with determining physical downlink control channel candidates aggregated over different numbers of monitoring occasions, in accordance with the present disclosure.

FIG. 4 is a diagram illustrating an example 400 associated with determining PDCCH candidates aggregated over different numbers of monitoring occasions, in accordance with the present disclosure. As shown in FIG. 4, a UE (e.g., UE 120) may communicate with a base station (e.g., base station 110). The UE and the base station may be part of a wireless network (e.g., wireless network 100).

As shown by reference number 405, the base station may transmit, and the UE may receive, configuration information. In some aspects, the UE may receive the configuration information from another device (e.g., from another base station, another UE, and/or the like), from a specification of a communication standard, and/or the like. In some aspects, the UE may receive the configuration information via one or more of radio resource control (RRC) signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to determine a first subset of PDCCH candidates and a second subset of PDCCH candidates, where the first subset of PDCCH candidates are each aggregated within a single PDCCH monitoring occasion and the second subset of PDCCH candidates are each aggregated across multiple PDCCH monitoring occasions. In some aspects, the configuration information may provide information for determining the first subset and the second subset (e.g., determining whether particular PDCCH candidates are assigned to the first subset or the second subset), such as an indication of an aggregation level threshold. The UE may identify PDCCH candidates that are to be aggregated within a single PDCCH monitoring occasion (e.g., the first subset of PDCCH candidates) and PDCCH candidates that are to be aggregated across multiple PDCCH monitoring occasions (e.g., the second subset of PDCCH candidates) based at least in part on the information (e.g., the indication of the aggregation threshold).

In some aspects, the configuration information may indicate that the UE is to determine the aggregation threshold based at least in part on one or more parameters of a CORESET that includes the set of PDCCH candidates. For example, the configuration information may indicate that the UE is to determine the aggregation threshold based at least in part on a frequency range of the CORESET, a frequency band of the CORESET, a subcarrier spacing of the CORESET, a number of symbols of the CORESET, a number of resources (e.g., CCEs, resource blocks, REGs, and/or the like) of the CORESET, and/or the like.

In some aspects, the configuration information may indicate that the UE is to determine the aggregation threshold based at least in part on an indication within a search space configuration associated with the set of PDCCH candidates, an explicit indication within dynamic signaling (e.g., UE-specific DCI or MAC CE, group-common DCI or MAC CE, and/or the like), an implicit indication within dynamic signaling (e.g., an indication of coverage enhancement, an indication of monitoring aggregation, and/or the like), and/or the like.

As shown by reference number 410, the UE may configure the UE for communicating with the one or more base stations. In some aspects, the UE may configure the UE based at least in part on the configuration information. In some aspects, the UE may be configured to perform one or more operations described herein.

As shown by reference number 415, the UE may receive, and the base station may transmit, an indication of a set of aggregation levels for a set of PDCCH candidates within a search space. For example, the UE may receive an indication of a search space configuration. The indication may identify a known search space configuration (e.g., an indication of a previously received search space configuration), an explicit description of the search space configuration, and/or the like.

As shown by reference number 420, the UE may receive, and the base station may transmit, an indication of an aggregation threshold. In some aspects, the indication of the aggregation threshold may be received in a same message as the indication of the set of aggregation levels (e.g., a search space configuration message), the configuration information, and/or the like. In some aspects, the UE may receive the indication of the aggregation threshold via dynamic signaling (e.g., a DCI message, one or more MAC CEs, and/or the like), RRC signaling (e.g., a configured grant), and/or the like.

In some aspects, the indication may be an explicit indication or an implicit indication. For example, the indication may be an explicit indication within dynamic signaling, such as UE-specific or a group-common DCI message or one or more MAC CEs. The indication may be an implicit indication within dynamic signaling, such as an indication of coverage enhancement, an indication of monitoring aggregation, and/or the like.

As shown by reference number 425, the UE may determine a first subset of PDCCH candidates and a second subset of PDCCH candidates. In some aspects, the UE may determine the first subset of PDCCH candidates and the second subset of PDCCH candidates based at least in part on indicated aggregation levels of each of the first subset of PDCCH candidates and each of the second subset of PDCCH candidates. The UE may determine the second subset of PDCCH candidates based at least in part on each PDCCH candidate of the second subset of PDCCH candidates having aggregation levels that satisfy the aggregation level threshold.

In some aspects, the UE may determine the aggregation level threshold based at least in part on the indication of the aggregation level threshold, the configuration information, the search space configuration, and/or the like. In some aspects, the UE may determine the aggregation level threshold based at least in part on a definition based at least in part on configuration information, a frequency range of a control resource set (CORESET) that includes the set of PDCCH candidates, a frequency band of the CORESET, a subcarrier spacing of the CORESET, a number of symbols of the CORESET, a number of resources of the CORESET, and/or the like.

In some aspects, one or more CCEs may be assigned to both of a PDCCH candidate within the first subset of PDCCH candidates and a PDCCH candidate within the second subset of PDCCH candidates. In some aspects, one or more PDCCH candidates within the first subset of PDCCH candidates may be aggregated within a first PDCCH monitoring occasion and one or more PDCCH candidates within the first subset of PDCCH candidates may be aggregated within a second PDCCH monitoring occasion.

As shown by reference number 430, the UE may receive, and the base station may transmit, a downlink communication including the set of PDCCH candidates (e.g., including the first subset of PDCCH candidates and the second subset of PDCCH candidates). In some aspects, the UE may receive the downlink communication based at least in part on the CORESET configuration, a previously received grant (e.g., a dynamic grant, a configured grant, and/or the like), and/or the like.

As shown by reference number 435, the UE may monitor the set of PDCCH candidates for a PDCCH communication. For example, the UE may monitor the set of PDCCH candidates within single PDCCH monitoring occasions of a search space (e.g., for PDCCH candidates of the first subset) and within multiple PDCCH monitoring occasions of the search space (e.g., for PDCCH candidates of the second subset).

Based at least in part on the UE monitoring for the first subset of PDCCH candidates within a single PDCCH monitoring occasion and for the second subset of PDCCH candidates within multiple PDCCH monitoring occasions, the UE may conserve computing, communication, network, and power resources by receiving a PDCCH message using a single PDCCH monitoring occasion when appropriate (e.g., based at least in part on channel conditions) and receiving a PDCCH message using multiple PDCCH monitoring occasions when appropriate.

As indicated above, FIG. 4 is provided as an example. Other examples may differ from what is described with respect to FIG. 4.

Figure 5:
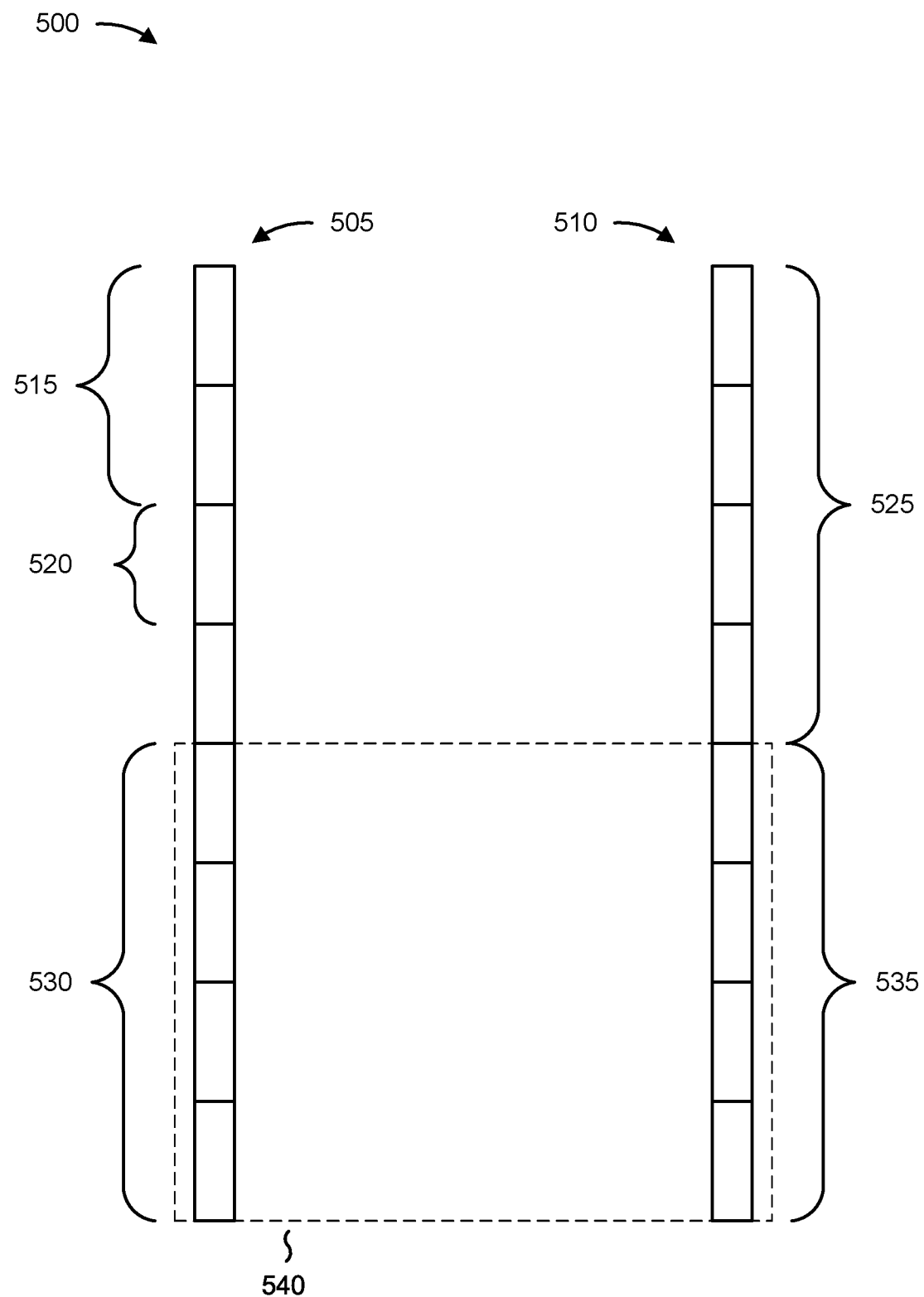

FIG. 5 is a diagram illustrating an example 500 associated with determining PDCCH candidates aggregated over different numbers of monitoring occasions, in accordance with the present disclosure.

As shown in FIG. 5, a CORESET may include a first PDCCH monitoring occasion 505 and a second PDCCH monitoring occasion 510. In some aspects, the two PDCCH monitoring occasions 505 and 510 may be within a slot of a subframe.

A first PDCCH monitoring occasion 505 may include two CCEs associated with a first PDCCH candidate 515. The first PDCCH monitoring occasion 505 may include a single CCE associated with a second PDCCH candidate 520. The second PDCCH monitoring occasion 510 may include four CCEs associated with a third PDCCH candidate 525.

The first PDCCH monitoring occasion 505 may include a first portion 530 (e.g., one or more CCEs) of a fourth PDCCH candidate 540 and the second PDCCH monitoring occasion 510 may include a second portion 535 of the fourth PDCCH candidate 540. In other words, the first PDCCH candidate 515, the second PDCCH candidate 520, and the third PDCCH candidate 525 may be assigned to a first subset of PDCCH candidates that are aggregated within single PDCCH monitoring occasions and the fourth PDCCH candidate 540 may be assigned to a second subset of PDCCH candidates that are aggregated across the two PDCCH monitoring occasions 505 and 510.

As indicated above, FIG. 5 is provided as an example. Other examples may differ from what is described with respect to FIG. 5.

Figure 6:
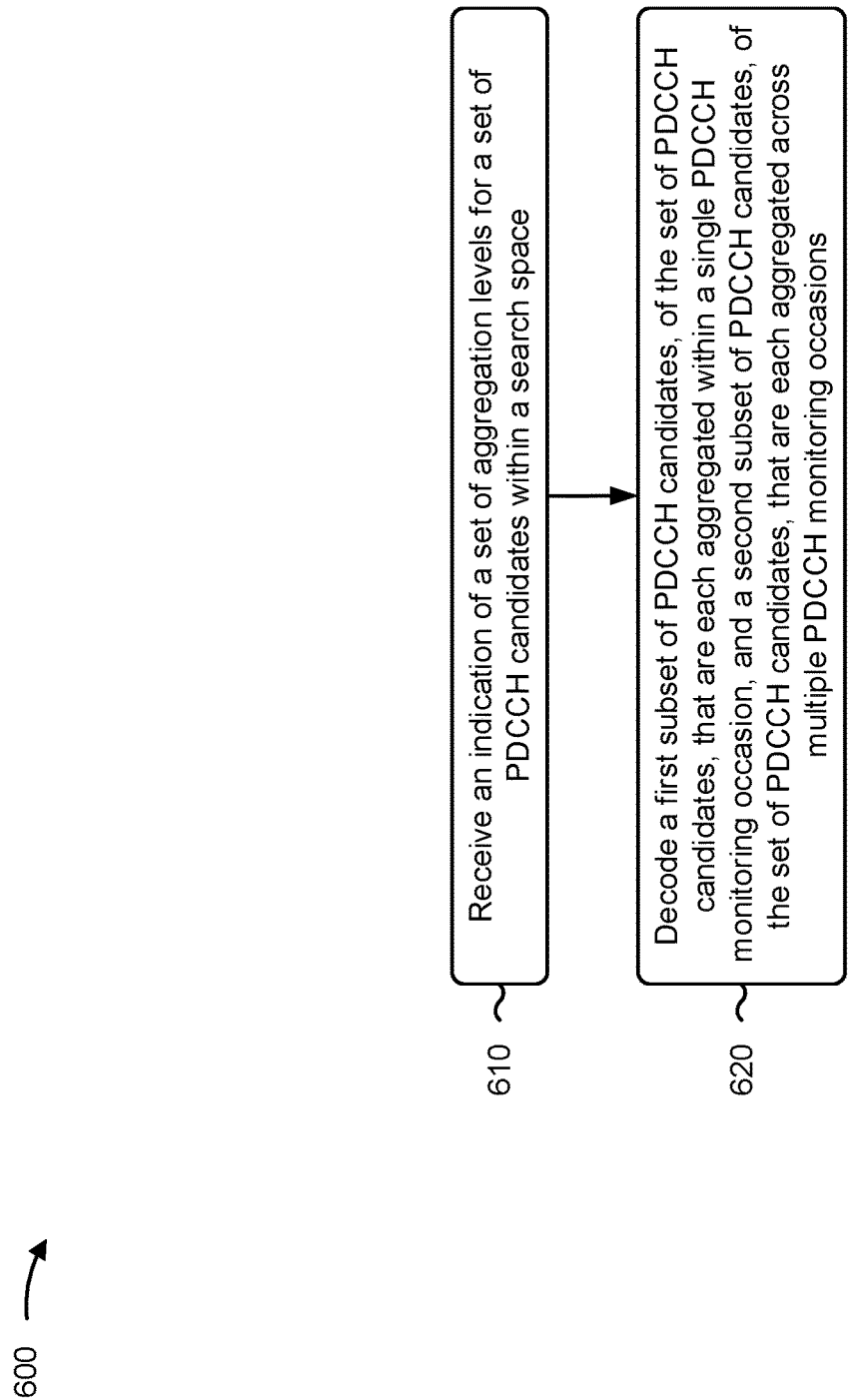
FIGS. 6 and 7 are diagrams illustrating example processes associated with determining physical downlink control channel candidates aggregated over different numbers of monitoring occasions, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with PDCCH candidates aggregated over different numbers of monitoring occasions.

As shown in FIG. 6, in some aspects, process 600 may include receiving an indication of a set of aggregation levels for a set of PDCCH candidates within a search space (block 610). For example, the UE (e.g., using receive processor 258, controller/processor 280, memory 282, and/or the like) may receive an indication of a set of aggregation levels for a set of PDCCH candidates within a search space, as described above.

As further shown in FIG. 6, in some aspects, process 600 may include decoding a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions (block 620). For example, the UE (e.g., using receive processor 258, controller/processor 280, memory 282, and/or the like) may decode a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions, as described above.

Process 600 may include additional aspects, such as any single aspect or any combination of aspects described below and/or in connection with one or more other processes described elsewhere herein.

In a first aspect, process 600 includes monitoring the first subset of PDCCH candidates within the single PDCCH monitoring occasion and monitoring the second subset of PDCCH candidates on the multiple PDCCH monitoring occasions.

In a second aspect, alone or in combination with the first aspect, decoding the first subset of PDCCH candidates and the second subset of PDCCH candidates includes determining the first subset of PDCCH candidates and the second subset of PDCCH candidates based at least in part on indicated aggregation levels of each of the first subset of PDCCH candidates and each of the second subset of PDCCH candidates.

In a third aspect, alone or in combination with one or more of the first and second aspects, the second subset of PDCCH candidates have aggregation levels that each satisfy an aggregation level threshold.

In a fourth aspect, alone or in combination with one or more of the first through third aspects, the aggregation level threshold is based at least in part on one or more of: a definition based at least in part on configuration information, a frequency range of a CORESET that includes the set of PDCCH candidates, a frequency band of the CORESET, a subcarrier spacing of the CORESET, a number of symbols of the CORESET, or a number of resources of the CORESET.

In a fifth aspect, alone or in combination with one or more of the first through fourth aspects, process 600 includes determining the aggregation level threshold based at least in part on one or more of: a search space configuration, RRC signaling, a DCI message, or one or more MAC CEs.

In a sixth aspect, alone or in combination with one or more of the first through fifth aspects, process 600 includes determining the aggregation level threshold based at least in part on one or more of an implicit indication or an explicit indication of the aggregation level threshold.

In a seventh aspect, alone or in combination with one or more of the first through sixth aspects, a first PDCCH candidate, of the first subset of PDCCH candidates, includes a first set of CCEs of a first PDCCH monitoring occasion; and a second PDCCH candidate, of the second subset of PDCCH candidates, includes the first set of CCEs of the first PDCCH monitoring occasion and a second set of CCEs of a second PDCCH monitoring occasion.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
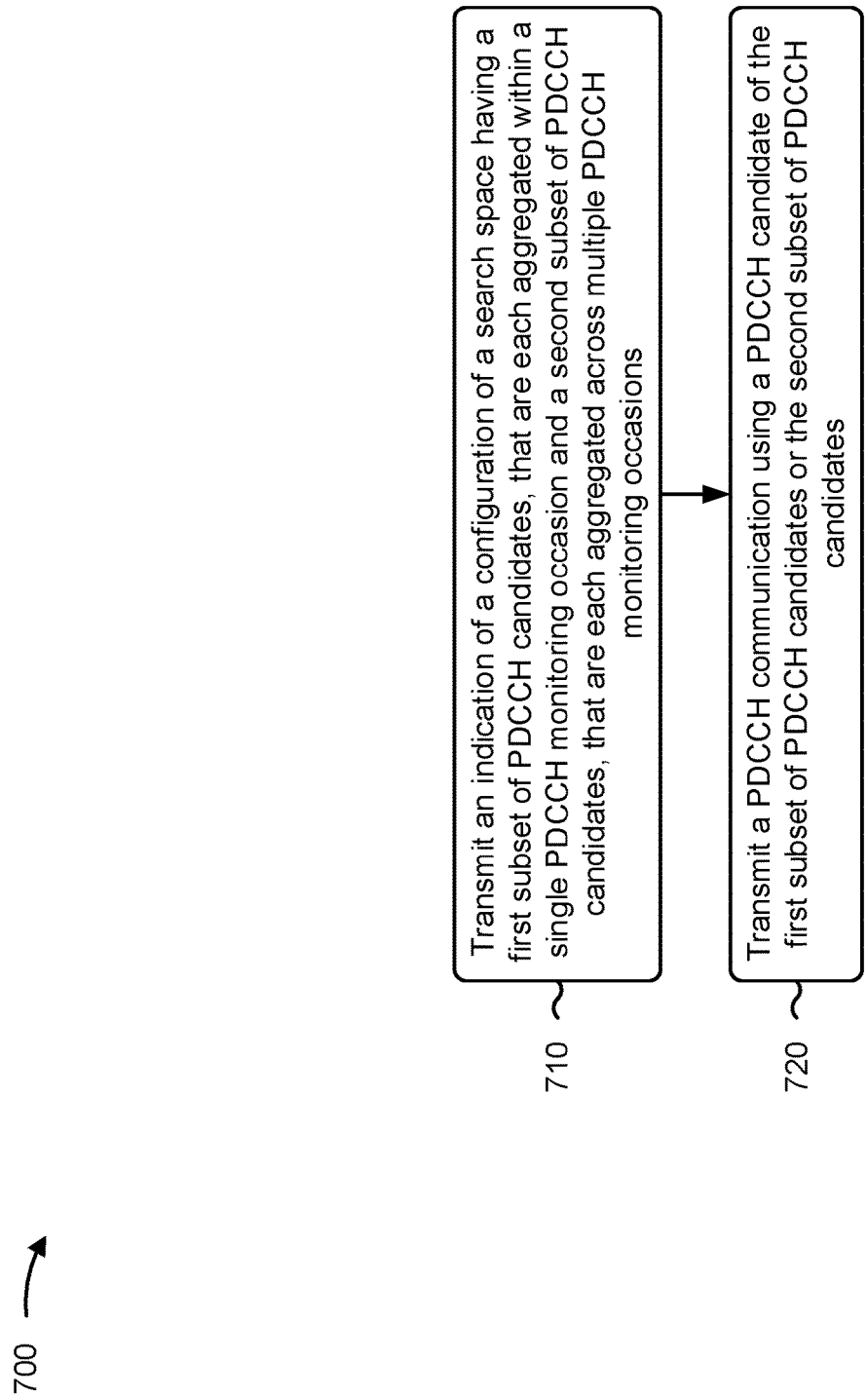

FIG. 7 is a diagram illustrating an example process 700 performed, for example, by a base station, in accordance with the present disclosure. Example process 700 is an example where the base station (e.g., base station 110) performs operations associated with physical downlink control channel candidates aggregated over different numbers of monitoring occasions.

As shown in FIG. 7, in some aspects, process 700 may include transmitting an indication of a configuration of a search space having a first subset of PDCCH candidates, that are each aggregated within a single PDCCH monitoring occasion, and a second subset of PDCCH candidates, that are each aggregated across multiple PDCCH monitoring occasions (block 710). For example, the base station (e.g., using controller/processor 240, transmit processor 220, TX MIMO processor 230, MOD 232, and/or antenna 234, among other examples) may transmit an indication of a configuration of a search space having a first subset of PDCCH candidates, that are each aggregated within a single PDCCH monitoring occasion and a second subset of PDCCH candidates, that are each aggregated across multiple PDCCH monitoring occasions, as described above.

As further shown in FIG. 7, in some aspects, process 700 may include transmitting a PDCCH communication using a PDCCH candidate of the first subset of PDCCH candidates or the second subset of PDCCH candidates (block 720). For example, the base station (using controller/processor 240, transmit processor 220, TX MIMO processor 230, MOD 232, and/or antenna 234, among other examples) may transmit a PDCCH communication using a PDCCH candidate of the first subset of PDCCH candidates or the second subset of PDCCH candidates, as described above.

Process 700 may include additional aspects, such as any single aspect or any combination of aspects described below and/or in connection with one or more other processes described elsewhere herein.

In a first aspect, a PDCCH candidate is associated with the first subset of PDCCH candidates or the second subset of PDCCH candidates based at least in part on an aggregation level of the PDCCH candidate.

In a second aspect, alone or in combination with the first aspect, the second subset of PDCCH candidates have aggregation levels that each satisfy an aggregation level threshold.

In a third aspect, alone or in combination with one or more of the first and second aspects, the aggregation level threshold is based at least in part on one or more of a definition based at least in part on configuration information, a frequency range of a CORESET that includes the set of PDCCH candidates, a frequency band of the CORESET, a subcarrier spacing of the CORESET, a number of symbols of the CORESET, or a number of resources of the CORESET.

In a fourth aspect, alone or in combination with one or more of the first through third aspects, process 700 includes transmitting an indication of the aggregation level threshold based at least in part on one or more of a search space configuration, RRC signaling, a DCI message, or one or more MAC CEs.

In a fifth aspect, alone or in combination with one or more of the first through fourth aspects, process 700 includes transmitting an indication of the aggregation level threshold based at least in part on one or more of an implicit indication or an explicit indication of the aggregation level threshold.

In a sixth aspect, alone or in combination with one or more of the first through fifth aspects, a first PDCCH candidate, of the first subset of PDCCH candidates, comprises a first set of control channel elements of a first PDCCH monitoring occasion, and a second PDCCH candidate, of the second subset of PDCCH candidates, comprises the first set of control channel elements of the first PDCCH monitoring occasion and a second set of control channel elements of a second PDCCH monitoring occasion.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: receiving an indication of a set of aggregation levels for a set of physical downlink control channel (PDCCH) candidates within a search space; and decoding a first subset of PDCCH candidates, of the set of PDCCH candidates, that are each aggregated within a single PDCCH monitoring occasion, and a second subset of PDCCH candidates, of the set of PDCCH candidates, that are each aggregated across multiple PDCCH monitoring occasions.

Aspect 2: The method of Aspect 1, further comprising: monitoring the first subset of PDCCH candidates within the single PDCCH monitoring occasion; and monitoring the second subset of PDCCH candidates on the multiple PDCCH monitoring occasions.

Aspect 3: The method of any of Aspects 1-2, wherein decoding the first subset of PDCCH candidates and the second subset of PDCCH candidates comprises: determining the first subset of PDCCH candidates and the second subset of PDCCH candidates based at least in part on indicated aggregation levels of each of the first subset of PDCCH candidates and each of the second subset of PDCCH candidates.

Aspect 4: The method of Aspect 3, wherein the second subset of PDCCH candidates have aggregation levels that each satisfy an aggregation level threshold.

Aspect 5: The method of Aspect 4, wherein the aggregation level threshold is based at least in part on one or more of: a definition based at least in part on configuration information, a frequency range of a control resource set (CORESET) that includes the set of PDCCH candidates, a frequency band of the CORESET, a subcarrier spacing of the CORESET, a number of symbols of the CORESET, or a number of resources of the CORESET.

Aspect 6: The method of any of Aspects 4-5, further comprising: determining the aggregation level threshold based at least in part on one or more of: a search space configuration, radio resource control signaling, a downlink control information message, or one or more medium access control control elements.

Aspect 7: The method of any of Aspects 4-6, further comprising: determining the aggregation level threshold based at least in part on one or more of an implicit indication or an explicit indication of the aggregation level threshold.

Aspect 8: The method of any of Aspects 1-7, wherein a first PDCCH candidate, of the first subset of PDCCH candidates, comprises a first set of control channel elements of a first PDCCH monitoring occasion, and wherein a second PDCCH candidate, of the second subset of PDCCH candidates, comprises the first set of control channel elements of the first PDCCH monitoring occasion and a second set of control channel elements of a second PDCCH monitoring occasion.

Aspect 9: A method of wireless communication performed by a base station, comprising: transmitting an indication of a configuration of a search space having a first subset of physical downlink control channel (PDCCH) candidates, that are each aggregated within a single PDCCH monitoring occasion and a second subset of PDCCH candidates, that are each aggregated across multiple PDCCH monitoring occasions; and transmitting a PDCCH communication using a PDCCH candidate of the first subset of PDCCH candidates or the second subset of PDCCH candidates.

Aspect 10: The method of Aspect 9, wherein a PDCCH candidate is associated with the first subset of PDCCH candidates or the second subset of PDCCH candidates based at least in part on an aggregation level of the PDCCH candidate.

Aspect 11: The method of Aspect 10, wherein the second subset of PDCCH candidates have aggregation levels that each satisfy an aggregation level threshold.

Aspect 12: The method of Aspect 11, wherein the aggregation level threshold is based at least in part on one or more of: a definition based at least in part on configuration information, a frequency range of a control resource set (CORESET) that includes the set of PDCCH candidates, a frequency band of the CORESET, a subcarrier spacing of the CORESET, a number of symbols of the CORESET, or a number of resources of the CORESET.

Aspect 13: The method of any of Aspects 11-12, further comprising: transmitting an indication of the aggregation level threshold based at least in part on one or more of: a search space configuration, radio resource control signaling, a downlink control information message, or one or more medium access control control elements.

Aspect 14: The method of any of Aspects 11-13, further comprising: transmitting an indication of the aggregation level threshold based at least in part on one or more of an implicit indication or an explicit indication of the aggregation level threshold.

Aspect 15: The method of any of Aspects 9-14, wherein a first PDCCH candidate, of the first subset of PDCCH candidates, comprises a first set of control channel elements of a first PDCCH monitoring occasion, and wherein a second PDCCH candidate, of the second subset of PDCCH candidates, comprises the first set of control channel elements of the first PDCCH monitoring occasion and a second set of control channel elements of a second PDCCH monitoring occasion.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving an indication of a set of aggregation levels for a set of physical downlink control channel (PDCCH) candidates within a search space; and
   decoding a first subset of PDCCH candidates, of the set of PDCCH candidates, that are within the search space and each aggregated within a single PDCCH monitoring occasion, and a second subset of PDCCH candidates, of the set of PDCCH candidates, that are within the search space and each aggregated across multiple PDCCH monitoring occasions of the search space.

2. The method of claim 1, further comprising:
   monitoring the first subset of PDCCH candidates within the single PDCCH monitoring occasion; and
   monitoring the second subset of PDCCH candidates on the multiple PDCCH monitoring occasions.

3. The method of claim 1, wherein decoding the first subset of PDCCH candidates and the second subset of PDCCH candidates comprises:
   determining the first subset of PDCCH candidates and the second subset of PDCCH candidates based at least in part on indicated aggregation levels of each of the first subset of PDCCH candidates and each of the second subset of PDCCH candidates.

4. The method of claim 3, wherein the second subset of PDCCH candidates have aggregation levels that each satisfy an aggregation level threshold.

5. The method of claim 4, wherein the aggregation level threshold is based at least in part on one or more of:
   a definition based at least in part on configuration information,
   a frequency range of a control resource set (CORESET) that includes the set of PDCCH candidates,
   a frequency band of the CORESET,
   a subcarrier spacing of the CORESET,
   a number of symbols of the CORESET, or
   a number of resources of the CORESET.

6. The method of claim 4, further comprising:
   determining the aggregation level threshold based at least in part on one or more of:
   a search space configuration,
   radio resource control signaling,
   a downlink control information message, or
   one or more medium access control control elements.

7. The method of claim 4, further comprising:
   determining the aggregation level threshold based at least in part on one or more of an implicit indication or an explicit indication of the aggregation level threshold.

8. The method of claim 1, wherein a first PDCCH candidate, of the first subset of PDCCH candidates, comprises a first set of control channel elements of a first PDCCH monitoring occasion, and
   wherein a second PDCCH candidate, of the second subset of PDCCH candidates, comprises the first set of control channel elements of the first PDCCH monitoring occasion and a second set of control channel elements of a second PDCCH monitoring occasion.

9. A method of wireless communication performed by a base station, comprising:
   transmitting an indication of a configuration of a search space having a first subset of physical downlink control channel (PDCCH) candidates, that are within the search space and each aggregated within a single PDCCH monitoring occasion and a second subset of PDCCH candidates, that are within the search space and each aggregated across multiple PDCCH monitoring occasions of the search space; and
   transmitting a PDCCH communication using a PDCCH candidate of the first subset of PDCCH candidates or the second subset of PDCCH candidates.

10. The method of claim 9, wherein the PDCCH candidate is associated with the first subset of PDCCH candidates or the second subset of PDCCH candidates based at least in part on an aggregation level of the PDCCH candidate.

11. The method of claim 10, wherein the second subset of PDCCH candidates have aggregation levels that each satisfy an aggregation level threshold.

12. The method of claim 11, wherein the aggregation level threshold is based at least in part on one or more of:
    a definition based at least in part on configuration information,
    a frequency range of a control resource set (CORESET) that includes the first subset of PDCCH candidates and the second subset of PDCCH candidates,
    a frequency band of the CORESET,
    a subcarrier spacing of the CORESET,
    a number of symbols of the CORESET, or
    a number of resources of the CORESET.

13. The method of claim 11, further comprising:
    transmitting an indication of the aggregation level threshold based at least in part on one or more of:
    a search space configuration,
    radio resource control signaling,
    a downlink control information message, or
    one or more medium access control control elements.

14. The method of claim 11, further comprising:
    transmitting an indication of the aggregation level threshold based at least in part on one or more of an implicit indication or an explicit indication of the aggregation level threshold.

15. The method of claim 9, wherein a first PDCCH candidate, of the first subset of PDCCH candidates, comprises a first set of control channel elements of a first PDCCH monitoring occasion, and
    wherein a second PDCCH candidate, of the second subset of PDCCH candidates, comprises the first set of control channel elements of the first PDCCH monitoring occasion and a second set of control channel elements of a second PDCCH monitoring occasion.

16. A user equipment (UE) for wireless communication, comprising:
    one or more memories; and
    one or more processors, coupled to the one or more memories, configured to cause the UE to:
    receive an indication of a set of aggregation levels for a set of physical downlink control channel (PDCCH) candidates within a search space; and
    decode a first subset of PDCCH candidates, of the set of PDCCH candidates, that are within the search space and each aggregated within a single PDCCH monitoring occasion, and a second subset of PDCCH candidates, of the set of PDCCH candidates, that are within the search space and each aggregated across multiple PDCCH monitoring occasions of the search space.

17. The UE of claim 16, wherein the one or more processors are further configured to cause the UE to:
monitor the first subset of PDCCH candidates within the single PDCCH monitoring occasion; and
monitor the second subset of PDCCH candidates on the multiple PDCCH monitoring occasions.

18. The UE of claim 16, wherein the one or more processors, to decode the first subset of PDCCH candidates and the second subset of PDCCH candidates, are configured to cause the UE to:
determine the first subset of PDCCH candidates and the second subset of PDCCH candidates based at least in part on indicated aggregation levels of each of the first subset of PDCCH candidates and each of the second subset of PDCCH candidates.

19. The UE of claim 18, wherein the second subset of PDCCH candidates have aggregation levels that each satisfy an aggregation level threshold.

20. The UE of claim 19, wherein the aggregation level threshold is based at least in part on one or more of:
a definition based at least in part on configuration information,
a frequency range of a control resource set (CORESET) that includes the set of PDCCH candidates,
a frequency band of the CORESET,
a subcarrier spacing of the CORESET,
a number of symbols of the CORESET, or
a number of resources of the CORESET.

21. The UE of claim 19, wherein the one or more processors are further configured to cause the UE to:
determine the aggregation level threshold based at least in part on one or more of:
a search space configuration,
radio resource control signaling,
a downlink control information message, or
one or more medium access control control elements.

22. The UE of claim 19, wherein the one or more processors are further configured to cause the UE to:
determine the aggregation level threshold based at least in part on one or more of an implicit indication or an explicit indication of the aggregation level threshold.

23. The UE of claim 16, wherein a first PDCCH candidate, of the first subset of PDCCH candidates, comprises a first set of control channel elements of a first PDCCH monitoring occasion, and
wherein a second PDCCH candidate, of the second subset of PDCCH candidates, comprises the first set of control channel elements of the first PDCCH monitoring occasion and a second set of control channel elements of a second PDCCH monitoring occasion.

24. A base station for wireless communication, comprising:
a one or more memories; and
one or more processors, coupled to the one or more memories, configured to cause the base station to:
transmit an indication of a configuration of a search space having a first subset of physical downlink control channel (PDCCH) candidates, that are within the search space and each aggregated within a single PDCCH monitoring occasion and a second subset of PDCCH candidates, that are within the search space and each aggregated across multiple PDCCH monitoring occasions of the search space; and
transmit a PDCCH communication using a PDCCH candidate of the first subset of PDCCH candidates or the second subset of PDCCH candidates.

25. The base station of claim 24, wherein the PDCCH candidate is associated with the first subset of PDCCH candidates or the second subset of PDCCH candidates based at least in part on an aggregation level of the PDCCH candidate.

26. The base station of claim 25, wherein the second subset of PDCCH candidates have aggregation levels that each satisfy an aggregation level threshold.

27. The base station of claim 26, wherein the aggregation level threshold is based at least in part on one or more of:
a definition based at least in part on configuration information,
a frequency range of a control resource set (CORESET) that includes first subset of PDCCH candidates and the second subset of PDCCH candidates,
a frequency band of the CORESET,
a subcarrier spacing of the CORESET,
a number of symbols of the CORESET, or
a number of resources of the CORESET.

28. The base station of claim 26, wherein the one or more processors are further configured to cause the base station to:
transmit an indication of the aggregation level threshold based at least in part on one or more of:
a search space configuration,
radio resource control signaling,
a downlink control information message, or
one or more medium access control control elements.

29. The base station of claim 26, wherein the one or more processors are further configured to cause the base station to:
transmit an indication of the aggregation level threshold based at least in part on one or more of an implicit indication or an explicit indication of the aggregation level threshold.

30. The base station of claim 24, wherein a first PDCCH candidate, of the first subset of PDCCH candidates, comprises a first set of control channel elements of a first PDCCH monitoring occasion, and
wherein a second PDCCH candidate, of the second subset of PDCCH candidates, comprises the first set of control channel elements of the first PDCCH monitoring occasion and a second set of control channel elements of a second PDCCH monitoring occasion.

* * * * *